A. MAYER.

ORNAMENTING FUR AND OTHER GOODS.

No. 10,245. Reissued Nov. 21, 1882.

WITNESSES:

C. Neveux

E. Sedgwick

INVENTOR:

A. Mayer

BY Munn & Co.

ATTORNEYS.

N. PETERS, Photo-Lithographer, Washington, D. C.

UNITED STATES PATENT OFFICE.

AMALIA MAYER, OF NEW YORK, N. Y.

ORNAMENTING FUR AND OTHER GOODS.

SPECIFICATION forming part of Reissued Letters Patent No. 10,245, dated November 21, 1882.

Original No. 260,589, dated July 4, 1882. Application for reissue filed October 28, 1882.

*To all whom it may concern:*

Be it known that I, AMALIA MAYER, of the city, county, and State of New York, have invented a new and useful Improvement in Ornamenting Furs and other Goods, of which the following is a full, clear, and exact description.

The invention relates to the ornamentation of fur, plush, rough or open felt, and other goods having the filaments on their exterior surfaces free and projecting, by what is known in fur goods as "pointing"—that is, by the insertion at numerous points throughout the fur of hair different from the fibers or filaments of the fur.

The invention consists in pointing such fur or fluffy goods with hairs or filaments having beads or "bugles" attached to their outer ends and in the material or article thus decorated or ornamented.

Reference is to be had to the accompanying drawings, forming part of this specification, in which similar letters of reference indicate corresponding parts in both the figures.

Figure 1:
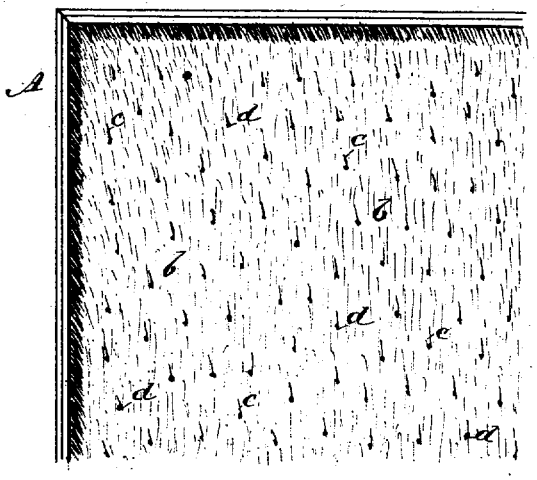
Figure 2:
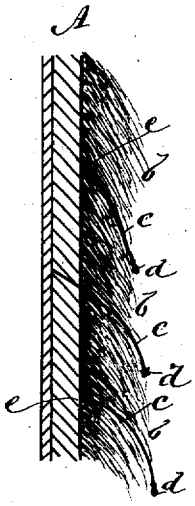

Figure 1 represents an outside face or surface view of a piece of fur ornamented in accordance with my invention, and Fig. 2 a transverse section of the same upon an enlarged scale.

A in the drawings indicates the skin or backing of the piece of fur, and *b b* the fur fibers or filaments projecting from the surface thereof. The pointing-hairs are indicated by the letters *c c*. These hairs or filaments may be of any desired description, length, and color. Before pointing the fur with them, said hairs are tipped on their outer ends with beads or bugles, *d d*, which may be of any desired shape, color, size, and material. The beads or bugles may be secured on the outer ends of said hairs by passing said ends through the beads or bugles and fastening them thereto by any suitable adhesive material, or otherwise. After the pointing-hairs *c c* have been thus tipped with the beads or bugles *d d*, they are dipped at their inner ends or portions in adhesive material of a fluid or plastic consistency, and inserted by blowing between or separating the fibers or filaments *b b* in the fur at numerous points thereof, and in which they are secured by the adhesive material *e* on them; or said hairs *c c* may be secured to the fur by crocheting or otherwise.

Goods or trimmings thus pointed with hairs having beads or bugles on their outer ends, present a very striking and highly ornamental appearance, and may be used for various articles of dress, including ladies' hats, cloaks, and other garments. The beads or bugles, with their attached pointing-hairs, have a pendent or drooping effect, which adds very much to the decorative aspect of the goods.

Having thus described my invention, I claim as new and desire to secure by Letters Patent—

1. The improved mode of ornamenting by pointing fur, plush, or other goods or materials by inserting at numerous points in said goods, among the protruding fibers or filaments thereof, hairs or filaments having beads or bugles attached to their outer ends or portions, substantially as specified.

2. A fur, plush, or other fluffy material having hairs or filaments provided with beads or bugles on their outer ends or portions inserted at numerous points throughout the protruding fibers or filaments of the material, essentially as shown and described.

AMALIA MAYER.

Witnesses:
OSCAR F. GUNZ,
C. SEDGWICK.